United States Patent [19]

Mallary

[11] Patent Number: 4,931,886
[45] Date of Patent: Jun. 5, 1990

[54] APPARATUS AND METHODS TO SUPPRESS PERPENDICULAR FIELDS IN LONGITUDINAL RECORDING

[75] Inventor: Michael L. Mallary, Berlin, Mass.

[73] Assignee: Digital Equipment Corporation, Maynard, Mass.

[21] Appl. No.: 212,876

[22] Filed: Jun. 29, 1988

[51] Int. Cl.[5] .......................... G11B 5/02; G11B 5/17; G11B 5/127

[52] U.S. Cl. ..................................... 360/55; 360/123; 360/125

[58] Field of Search .................. 360/55, 125, 123, 119

[56] References Cited

U.S. PATENT DOCUMENTS

| | | | |
|---|---|---|---|
| 2,975,241 | 3/1961 | Camras | 360/123 |
| 3,497,633 | 2/1970 | Rankin | 360/123 |
| 3,526,725 | 9/1970 | Camras | 360/123 |
| 3,534,345 | 10/1970 | Tiemann | 360/123 |
| 3,651,282 | 3/1972 | Gerry | 360/123 |
| 3,660,617 | 5/1972 | Hagopian | 360/123 |
| 3,670,114 | 6/1972 | Johnson et al. | 360/123 |
| 3,681,526 | 8/1972 | Camras | 360/123 |
| 3,683,407 | 8/1972 | Paul et al. | 360/123 |
| 4,295,173 | 10/1981 | Romankiw et al. | 360/125 |
| 4,393,428 | 7/1983 | Fujimura | 360/123 |
| 4,737,873 | 4/1988 | Dessere | 360/123 |

Primary Examiner—Robert S. Tupper
Attorney, Agent, or Firm—Neuman, Williams, Anderson & Olson

[57] ABSTRACT

Methods and apparatus for suppressing perpendicular recording head field components that occur proximate recorded magnetic transitions on longitudinally recorded magnetic media with opposing components generated by auxiliary magnetic field paths, as well as methods and apparatus for uncoupling the auxiliary magnetic field paths to improve symmetry of reproduced signals.

53 Claims, 8 Drawing Sheets

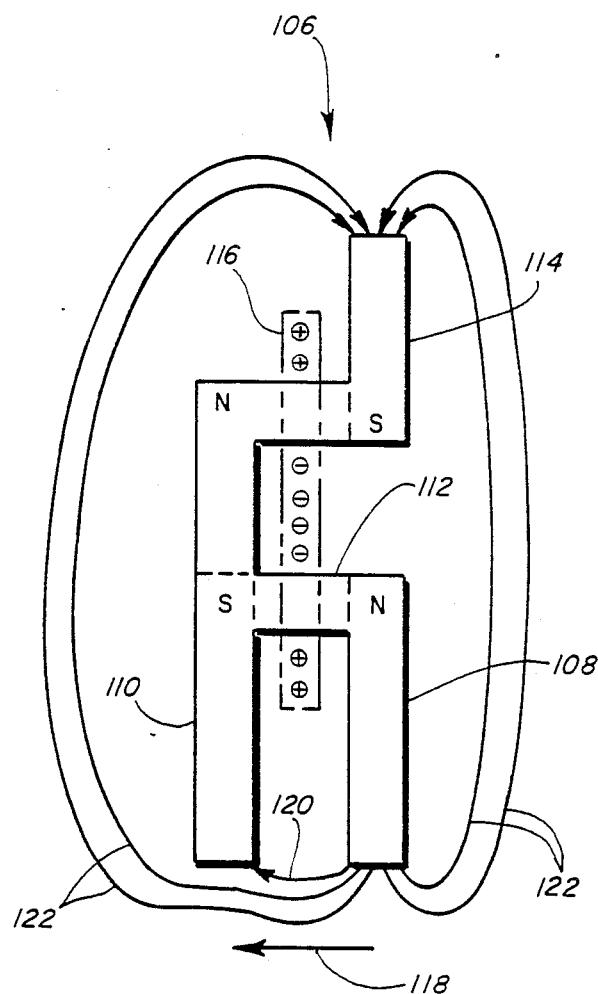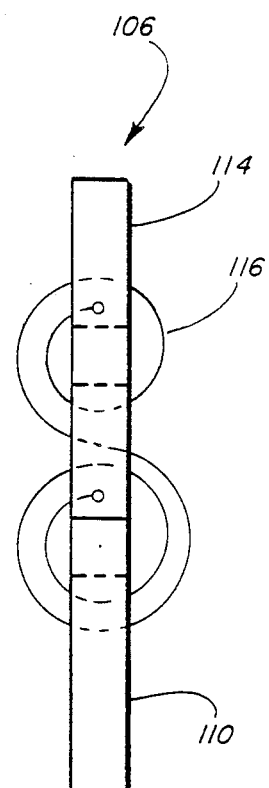
FIG. 8
FIG. 9

APPARATUS AND METHODS TO SUPPRESS PERPENDICULAR FIELDS IN LONGITUDINAL RECORDING

BACKGROUND OF THE INVENTION

The present invention relates to magnetic recording systems, and particularly to methods and apparatus for minimizing perpendicular field components proximate the air gap of longitudinal magnetic recording heads to maximize recording density.

The magnetic characteristics of longitudinal magnetic recording media are degraded by the perpendicular components of the magnetic recording head field which are present proximate magnetic transitions on such recording media as the transitions are recorded by the recording head. This degradation due to perpendicular field components causes wider recorded magnetic transitions on the recording medium and less magnetization than would be obtainable if these perpendicular field components were not present. The resulting loss of reproduction signal amplitude with high density magnetic transitions becomes particularly severe for recording heads subject to high overwrite caused by high recording level fields. This creates a severe recording head manufacturing yield problem because of conflicting design considerations between heads which exhibit high overwrite capability and heads which provide high recording levels.

SUMMARY OF THE INVENTION

The present invention overcomes recording losses caused by perpendicular field components for recording heads that occur proximate recorded magnetic transitions on longitudinally recorded magnetic media by methods and apparatus for suppressing such perpendicular field components with opposing components generated by auxiliary magnetic field paths. The present invention also includes methods and apparatus for uncoupling the auxiliary magnetic field paths during reproduction to improve symmetry of reproduction signals.

These and other advantages of the present invention are described below in connection with the description of the preferred embodiments and recited in the appended claims.

DESCRIPTION OF THE DRAWINGS

FIGS. 8 and 9 are different views of a fifth embodiment of the present invention.

DESCRIPTION OF THE PREFERRED EMBODIMENTS

The present invention suppresses perpendicular components of a longitudinal recording head field proximate the down stream pole of the recording head as magnetic transitions are recorded on corresponding recording media. This perpendicular field component suppression reduces high frequency amplitude losses that are associated with such perpendicular field components. The various embodiments of the invention described below are particularly directed to combining recording head perpendicular field component suppression with recording process simplicity and symmetrical reproducing signal capabilities.

Figure 1:
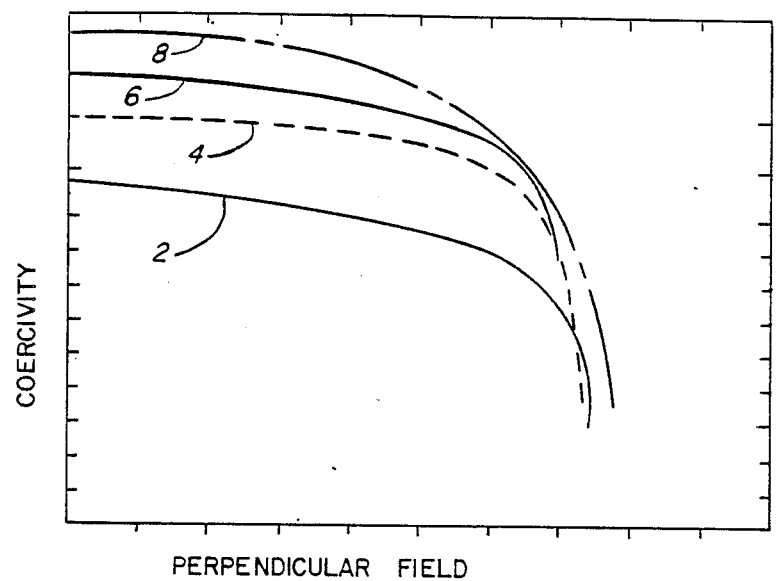
FIG. 1 is a graphical representation of coercivity of typical recording media as a function of perpendicular recording field components for a typical recording head.
Figure 2:
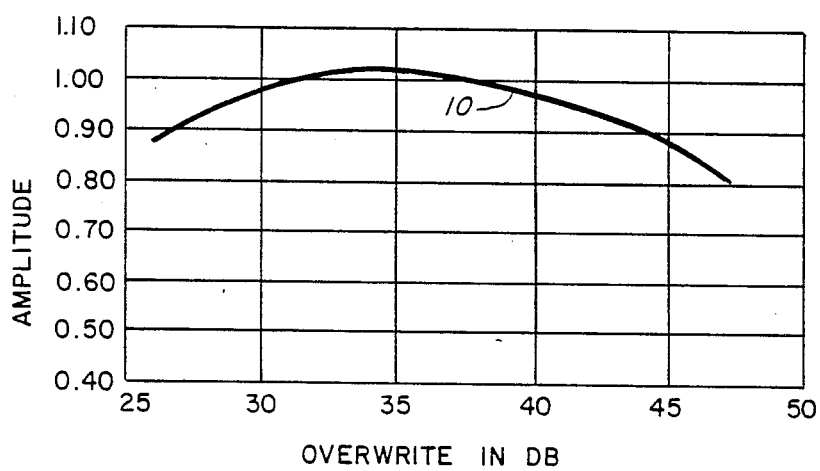
FIG. 2 is a graphical representation of reproduction signal amplitude as a function of recording overwrite level for typical recording system.

Referring to the drawings, wherein reference characters designate like or corresponding parts throughout the views, FIG. 1 shows a graphical representation of magnetic coercivity as a function of perpendicular recording field intensity for typical thin metallic film recording media. Such media exhibit a significant loss of coercivity with high values of perpendicular field. Curves 2, 4, 6 and 8 represent four different samples of thin metallic film recording media with increasing values of characteristic coercivities. With high rate recording head fields, the perpendicular field components become large enough to seriously reduce the coercivity of the recording media, thereby reducing the amplitude of high density recorded information during reproduction. However, high rate recording head fields are necessary to achieve adequate overwrite of newly recorded signals over old ones on prerecorded media. Therefore, reducing the perpendicular field components helps secure high reproduction signal amplitude and high recording overwrite simultaneously. FIG. 2 shows a graphical representation of high frequency reproduction amplitude response as a function of overwrite, with curve 10 representing the high frequency reproduction amplitude response of a typical recording system as a function of recording overwrite. It is apparent from FIG. 2 that increasing overwrite level causes a reduction in high frequency reproduction amplitude response due to increased perpendicular field components. Curve 10 shows that increasing overwrite causes a loss in high frequency reproduction signal amplitude in proportion to overwrite above an overwrite level of approximately 35 decibels.

Figure 3:
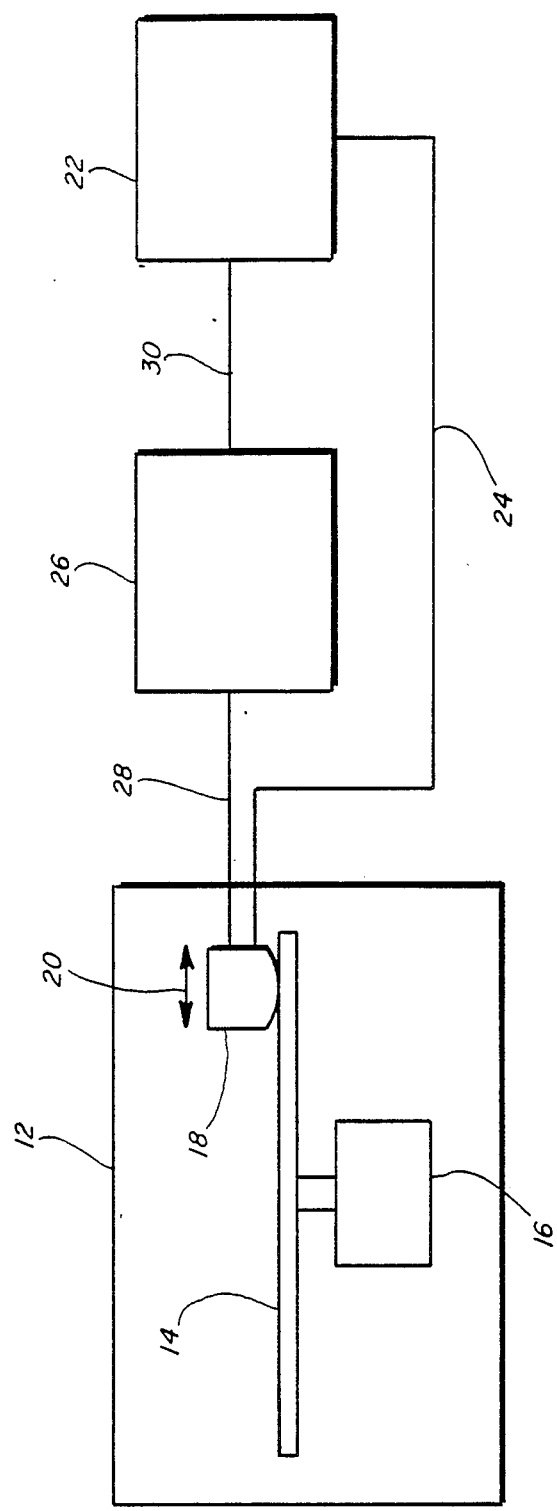
FIG. 3 is a functional block diagram of a typical disc drive recording system in which the present invention may be used.

FIG. 3 shows a functional block diagram of a typical disc drive recording system in which the present invention may be used. A disc drive system 12 includes a magnetic recording disc 14 driven by a drive motor 16, and a recording head 18, which scans the disc 14 radially track by track in the directions represented by the bidirectional arrow 20 a the disc 14 is rotated by the drive motor 16. The recording head 18 is driven by a recorder drive signal supplied by a recording signal source 22 via line 24. A secondary drive signal may also be supplied to the recording head 18. This secondary drive signal is supplied by an adjustable attenuator 26 via line 28 which adjustably attenuates the recorder drive signal supplied by the recording signal source 22 via line 30. Accordingly, when the secondary drive signal is fed to the recording head 18, both the recorder drive signal and a secondary drive signal representing an adjustably lower amplitude of the recorder drive signal separately feed the recording head 18. It should be understood that FIG. 3 is intended to be representative of a typical disc drive recording system, but that the present invention can also be used in a disc drive recording system comprising multiple recording heads and multiple magnetic recording discs.

Figure 4:
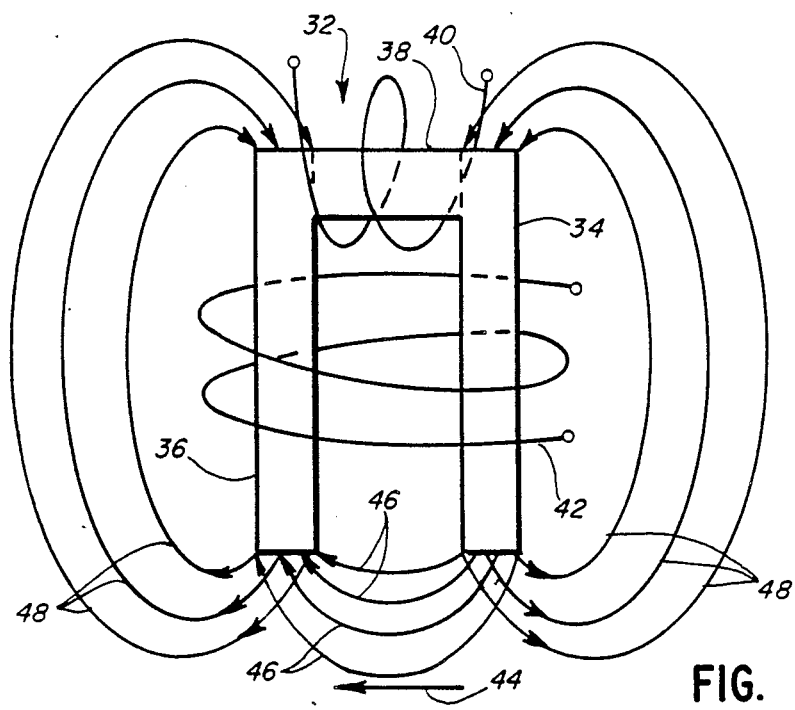
FIG. 4 is a basic conceptual embodiment of the present invention.

A basic conceptual embodiment of the present invention which overcomes the losses in coercivity of recording media due to perpendicular field components of a recording head is shown in FIG. 4. A recording head assembly 32 includes a first pole piece 34, a second pole piece 36, a bridge 38 between the first pole piece 34 and the second pole piece 36, a normal coil 40 wound around the bridge 38 and a perpendicular field bucking coil 42 wound around the first pole piece 34 and second pole piece 36, with its field axis aligned along their length between them. A non-magnetic gap between the free end of the first pole piece 34 and the free end of the second pole piece 36 may be air, ceramic or any other non-magnetic gap. Both the normal coil 40 and the perpendicular field bucking coil 42 are fed by the recorder drive signal, and the proportion of the recorder drive signal applied to the perpendicular field bucking coil 42 is adjusted to suppress the perpendicular field component of either the first pole piece 34 or the second pole piece 36. The choice of pole pieces depends upon the direction of the recording media used with the head assembly 32, since only the down stream pole is relevant, because it is the last pole that each recorded magnetic transition sees.

For instance, if a recording medium has motion relative to the head assembly 32 represented by the direction of arrow 44, the perpendicular field component proximate the second pole piece 36 must be suppressed. The normal recording head magnetic field generated by the recorder drive signal fed to the normal coil 40 is represented by normal magnetic field lines 46. The recorder drive signal may be supplied by the recorder signal source 22 via line 24 as shown in FIG. 3. It is apparent that the normal field represented by the normal field lines 46 includes a significant perpendicular component with respect to the gap between the first pole piece 34 and the second pole piece 36, which reduces the amplitude of the reproduced signal representing the corresponding magnetic transition because of reduced in plane coercivity.

To counteract this effect, the recorder drive signal is also fed to the perpendicular field bucking coil 42 to generate a magnetic field which establish the free ends of the first pole piece and the second pole piece as a common pole of a secondary magnetic field represented by secondary field lines 48. The phase of the recorder drive signal fed to the perpendicular field bucking coil 42 establishes the polarity of the secondary field represented by the secondary field lines 48 on the free end of the second pole piece 36 opposite to that due to the normal field represented by the normal field lines 46. Because of the long magnetic path of the secondary field lines 48, the secondary field represented by the secondary field lines 48 has a substantial perpendicular component from the second pole piece 36 which is opposed to the perpendicular component of the normal field represented by the normal field lines 46. By adjustment of the proportions of amplitudes of the recorder drive signal fed to the normal coil 40 and the perpendicular field bucking coil 42, the effective perpendicular field component can be reduced. The relative amplitude differential of the recorder drive signal fed to the normal coil 40 and the field bucking coil 42 is easily adjusted as shown in FIG. 3, wherein the normal coil 40 is fed directly from the recording signal source 22 via line 24, and the field bucking coil 42 is fed by the adjustable attenuator 26 via line 28, the adjustable attenuator 26 in turn being fed by the recording signal source 22 via line 30. Of course, at the same time the perpendicular field component proximate the first pole piece 34 is correspondingly increased, but this does not harm recorded magnetic transitions since they are recorded after passing the first pole piece 34. In fact, the loss of coercivity and remanance that occurs under the upstream pole improves overwrite performance because this effect tends to erase any remnants of unwanted magnetic transitions still on the recording medium before entering the recording head gap. Thus, the perpendicular component of the recording head field is reduced at the position in which recording occurs, and high recording medium coercivity combined with high reproduction signal amplitude is secured.

Figure 5:
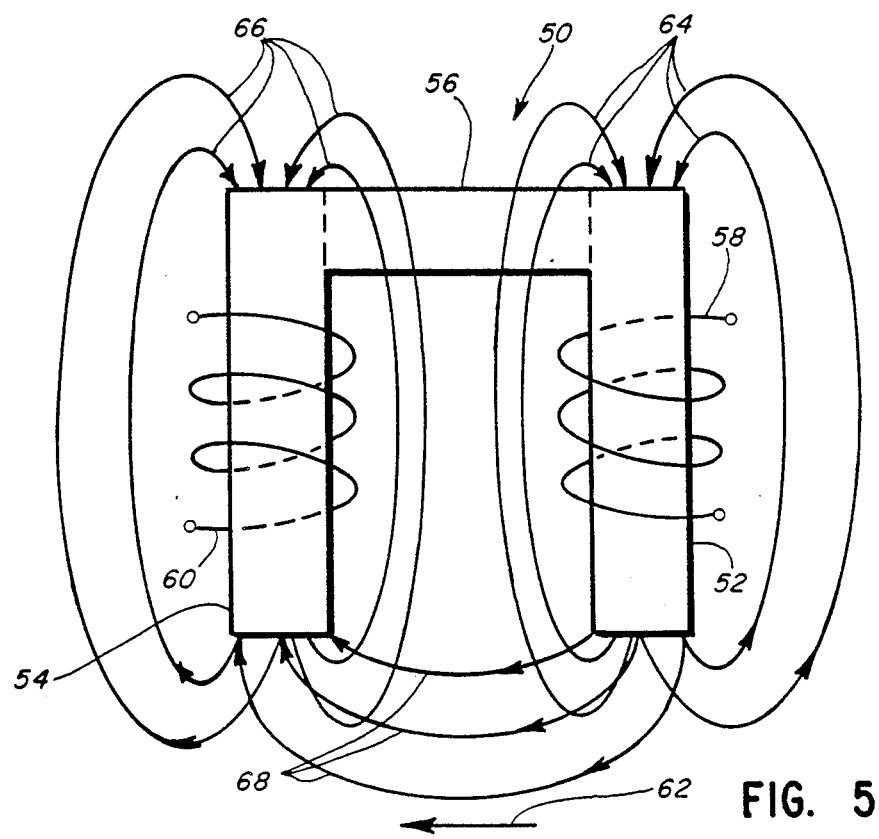
FIG. 5 a second embodiment of the present invention.

A second embodiment of the present invention which is equivalent in performance to the embodiment described above is shown in FIG. 5. A recording head assembly 50 includes a first pole piece 52, a second pole piece 54, a bridge 56 between the first pole piece 52 and the second pole piece 54, a first pole piece coil 58 wound around the first pole piece 52 and a second pole piece coil 60 wound around the second pole piece 54. If a recording medium has motion relative to the head assembly 50 represented by the direction of arrow 62, the effective perpendicular magnetic field component proximate the free end of the second pole piece 54 is suppressed.

If the first pole piece coil 58 and the second pole piece coil 60 are both fed by the recorder drive signal in proper phase, they will create respective first and second magnetic fields represented by first field lines 64 and second field lines 66, respectively, with the free ends of the first pole piece 52 and the second pole piece 54 of the same polarity. If the first pole piece 52 and the second pole piece 54 are identical, and the first pole piece coil 58 and the second pole piece coil 60 are identical as well, then the magnitudes of the first and second fields, represented by the first field lines 64 and the second field lines 66 respectively, are also identical, if the amplitude of the recorded drive signal fed to the first pole piece coil 58 and the second pole piece coil 60 is the same. Both fields will have substantial perpendicular components proximate the free ends of their respective pole pieces because of the long magnetic paths of the first field lines 64 and second field lines 66.

However, if a different amplitude of recorder drive signal is fed to the first pole piece coil 58 than the second pole piece coil 60, a normal recording head field represented by normal field lines 68 will be generated across the gap between the first pole piece 52 and the second pole piece 54. This normal field represented by the normal field lines 68 is established because the free end of the first pole piece 52 acquires a distinct polarity relative to the free end of the second pole piece 54, which creates a dipole circuit between them completed by the bridge 56. Although the normal field represented by the normal field lines 68 will have a significant perpendicular magnetic field component proximate the second pole piece 54, the perpendicular field component of the second field represented by the second field lines 66 will reduce that of the normal field represented by normal field lines 68 if the difference in amplitude of the recorder drive signal fed to the first pole piece solenoid coil 58 and the second solenoid coil 60 is properly adjusted. The relative amplitude differential of the recorder drive signal fed to the first pole piece coil 58 and the second pole piece coil 60 is easily adjusted as shown in FIG. 3, wherein the first pole piece coil 58 is fed directly by the recording signal source 22 via line 24, and the second pole piece coil is fed by the adjustable attenuator 26 via line 28, the adjustable attenuator 26 in turn being fed by the recording signal source 22 via line 30.

Of course, rather than shifting the amplitude of the recorder drive signal fed to the first pole piece coil 58 relative to the second pole piece coil 60, the number of coil turns of the first pole piece coil 58 could be changed relative to that of the second pole piece coil 60 to give the same effect. An increase in the number of coil turns will increase the effective corresponding magnetic field.

Figure 6:
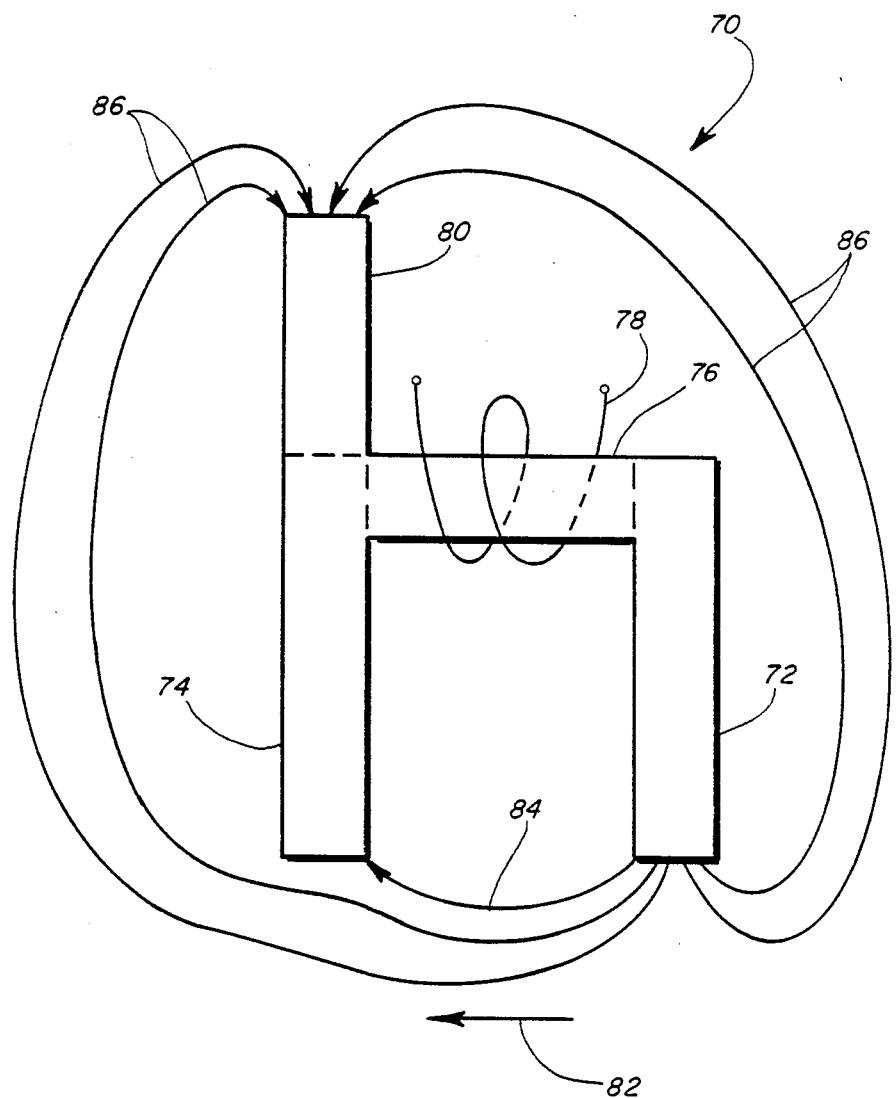
FIG. 6 is a third embodiment of the present invention.

A third embodiment of the present invention is shown in FIG. 6. A recording head assembly 70 includes a first pole piece 72, a second pole piece 74, a bridge 76 between the first pole piece 72 and the second pole piece 74, a normal coil 78 wound around the bridge 76, and a tail section 80 extending the second pole piece 74 beyond the bridge 76. The tail section 80 should extend the length of whichever pole piece is downstream with respect to motion of the recording medium. Because the tail section 80 is shown as extending the second pole piece 74, motion of the recording medium relative to the head assembly 70 should be as represented by the direction of arrow 82. If the tail 80 is connected to extend the first pole piece 72 instead, the motion of the recording medium should be opposite the direction represented by the arrow 82.

The tail section 80 serves to reduce the perpendicular magnetic field component proximate the second pole piece 74 by redistributing portions of the magnetic field between the first pole piece 72 and the second pole piece 74 to the tail section 80. A normal recording head magnetic field generated by the recorder drive signal, represented by a normal field line 84, has a small perpendicular field component proximate the second pole piece 74 because of a secondary magnetic field represented by secondary field lines 86, which extend between the first pole piece 72 and the free end of the tail section 80. Of course, this once again increases the perpendicular field component proximate the first pole piece 72, but this is not detrimental, as has been explained above. The tail section 80 need not be longitudinal as shown, and it may have any convenient configuration, such as curved, bent, or multisided, as long as it establishes a secondary magnetic field path which diminishes the perpendicular field component proximate the second pole piece 74. The recorder drive signal may be supplied by the recorder signal source 22 via line 24 as shown in FIG. 3.

Figure 7:
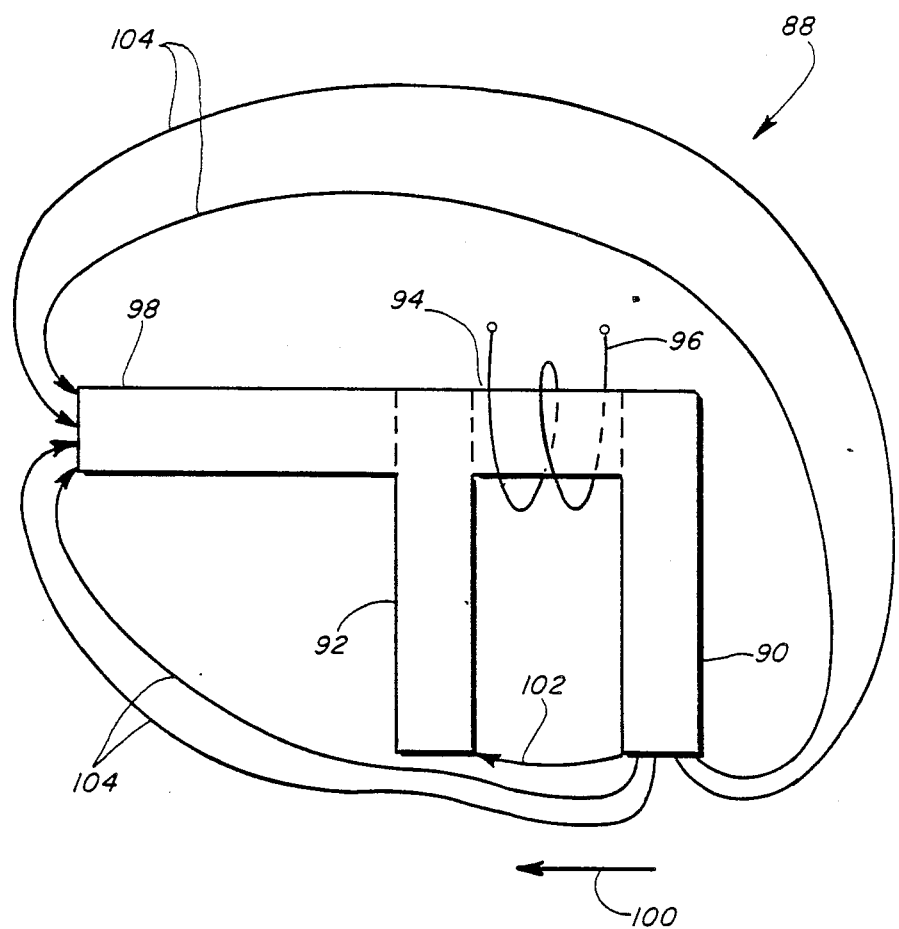
FIG. 7 is a fourth embodiment of the present invention.

One problem with the third embodiment of the present invention as described above is that magnetic field imbalance caused by the tail section 80 will produce reproduction signal asymmetry. A fourth embodiment of the present invention shown in FIG. 7 obviates such distortion during reproduction. A recording head assembly 88 includes a first pole piece 90, a second pole piece 92, a bridge 94 between the first pole piece 90 and the second pole piece 92, a normal coil 96 wound around the bridge 94, and a tail section 98 mounted along the axis of the normal coil 96. The tail section 98 is connected to the second pole piece 92, indicating that motion of a recording medium relative to the head assembly 88 should be in the direction represented by arrow 100, as has been explained above.

The tail section 98 has a magnetically anisotropic structure which conducts flux by domain wall motion. During reproduction of recorded magnetic transitions, there is an insufficient magnetic field to cause the domain wall motion in the tail section 98 to respond rapidly enough to the magnetic field to effectively conduct flux. Consequently, the tail section 98 does not magnetically unbalance the head assembly during reproduction, and symmetry of reproduction signals is secured. However, the much higher signal amplitude of the recorder drive signal causes rapid domain wall motion to occur during recording, so that the tail section 98 easily conducts flux. Therefore, during recording, the tail section 98 serves to reduce the perpendicular magnetic field component proximate the second pole piece 92 by redistributing portions of the magnetic field between the first pole piece 90 and the second pole piece 92 to the tail section 98. A normal recording head magnetic field generated by the recorder drive signal, represented by a normal field line 102, has a small perpendicular field component proximate the second pole piece 94 because of a secondary magnetic field represented by secondary field lines 104, which extend between the first pole piece 90 and the free end of tail section 98. Consequently, during recording, the fourth embodiment of the present invention operates equivalently to the third embodiment described above, except that during reproduction the tail section 98 is effectively uncoupled, so that no reproduction signal asymmetry can occur. The recorder drive signal may be supplied by the recorder signal source 22 via line 24 as shown in FIG. 3.

A fifth embodiment of the present invention is shown in top and side views in FIGS. 8 and 9 respectively. A recording head assembly 106 includes a first pole piece 108, a second pole piece 110, a bridge section 112 between the first pole piece 108 and the second pole piece 110, a bent tail section 114 and a serpentine coil 106 wrapped around both the bridge 112 and the central section of the tail section 114. As has been explained above, since the tail section 114 is connected to the second pole piece 110, motion of a recording medium relative to the head assembly 106 should be in a direction indicted by arrow 118.

The section of the serpentine coil 116 wound around the tail section 114 is reverse wound relative to the section wound around the bridge 112 to enhance the effect of the tail section 114. Specifically, this embodiment functions very much the same as the third embodiment described above, except that the effect of the tail section 114 is much greater. The tail section 114 serves to reduce the perpendicular magnetic field component proximate the second pole piece 110 by redistributing portions of the magnetic field between the first pole piece 108 and the second pole piece 110 to the tail section 114. A normal recording head magnetic field generated by the recorder drive signal, represented by a normal field line 120, has a small perpendicular field component because of a secondary magnetic field represented by secondary field lines 122, which extend between the first pole piece 108 and the free end of the tail section 114. The recorder drive signal may be supplied by the recorder signal source 22 via line 24 as shown in FIG. 3.

Alternatively, two separate coils can be substituted for the single serpentine coil 116, as long as they are correctly phased to enhance the secondary field represented by secondary field lines 122. Likewise, the tail section 114 only has the configuration shown for convenience, but may be linear, curvilinear or otherwise bent, which may be particularly desirable if two separate coils are substituted for the serpentine coil 116.

Figures 10, 11:
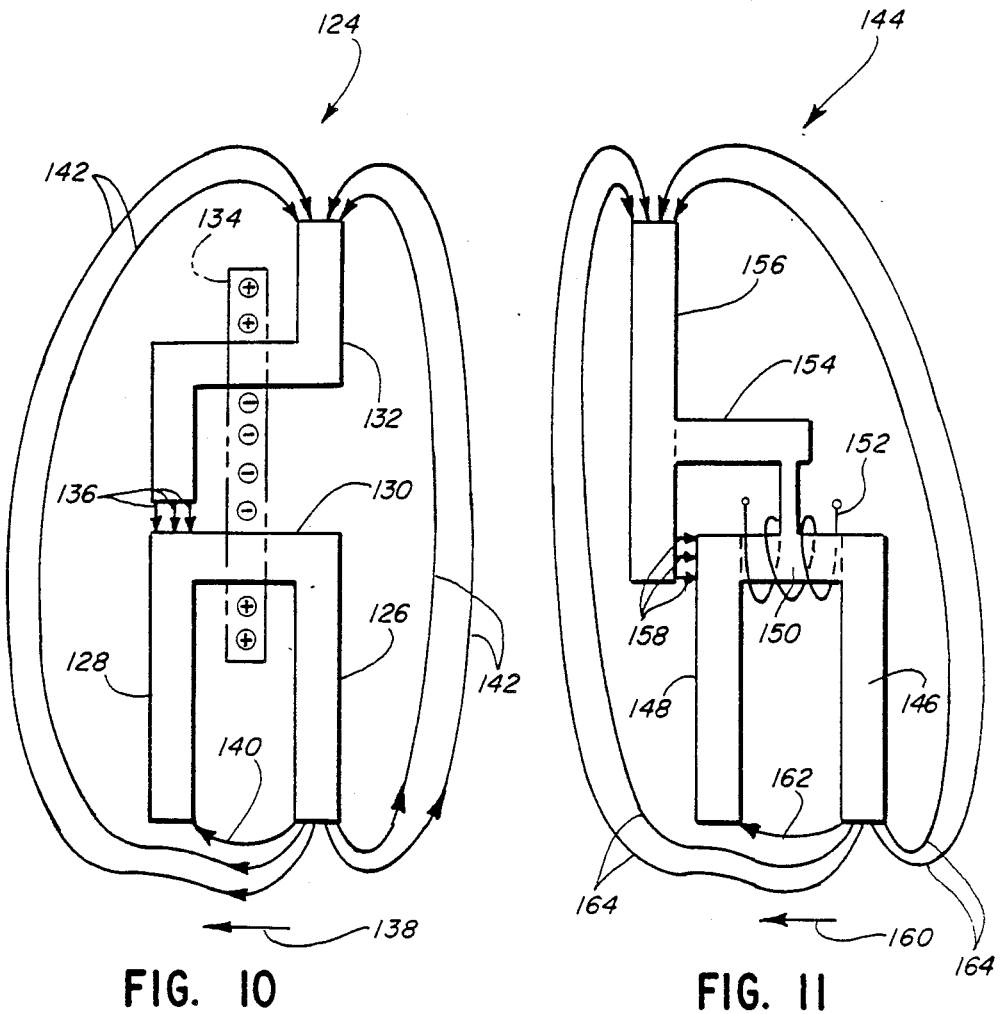
FIG. 10 is a seventh embodiment of the present invention.
FIG. 11 is a seventh embodiment of the present invention.

A sixth embodiment of the invention is shown in FIG. 10 has a non-magnetic gap between its tail section and the recording head, which can be advantageous from a manufacturing standpoint. A recording head assembly 124 includes a first pole piece 126, a second pole piece 128, a bridge 130 between the first pole piece 126 and the second pole piece 128, a bent tail section 132 with one free end separated from the second pole piece 128 by a non-magnetic gap proximate the bridge 130 and the bent tail section 132, with the section of the serpentine coil 134 wound around the tail section reverse wound relative to the section wound around the bridge 130 as with the fifth embodiment of the invention. This embodiment is equivalent to the fifth embodiment described above during recording if the magnetic impedance of the gap between the tail section 132 and the second pole piece 128 is small compared to the magnetic impedance between the first pole piece 126 and the second pole piece 128 to the tail section 132 through the magnetic path including the coil 134. This magnetic impedance of the gap occurs along a gap field path represented by gap field lines 136. Since the tail section 132 is coupled to the second pole piece 128, motion of a recording medium relative to the head assembly 124 should be in a direction represented by arrow 138.

During recording, the tail section 132 serves to reduce the perpendicular magnetic field component proximate the second pole piece 128 by redistributing portions of the magnetic field between the first pole piece 126 and the second pole piece 128 to the tail section 132. A normal recording head magnetic field generated by the recorder drive signal, represented by a normal field line 140, has a small perpendicular field component proximate the second pole piece 128 because of a secondary magnetic field represented by secondary field lines 142, which extend between the first pole piece 126 and the free end of the tail section 132.

Of course, the fifth and sixth embodiments of the invention described above will suffer from similar magnetic field imbalance problems during reproduction as has been explained above for the third embodiment. A seventh embodiment of the invention shown in FIG. 11 reduces reproduction signal asymetry due to magnetic imbalance. A recording head assembly 144 includes a first pole piece 146, a second pole piece 148, a bridge 150 between the first pole piece 146 and the second pole piece 158, a normal coil 152 wound around the bridge 150, a magnetically saturable bridge 154 coupled between the midpoint of the bridge 150 and a tail section 156, with a free end of the tail section 156 separated from the second pole piece 158 by a non-magnetic gap proximate the bridge 150.

During reproduction, the tail section 156 has virtually no effect upon reproduction signal quality because it is coupled to the midpoint of the bridge 150 through the magnetically saturable bridge 154. Because of the low signal levels during reproduction, the magnetically saturable bridge 154 cannot saturate, and the gap between the tail section 156 and the second pole piece 148 is too great to provide a significant magnetic field path. Therefore, the tail section 156 may be ignored during the reproduction process.

However, the high signal amplitude associated with recording saturates the magnetically saturable bridge 154, and also provides an effective magnetic field path across the gap between the tail section 156 and the second pole piece 148, represented by magnetic gap field lines 158. Since the tail section 156 is then coupled to the second pole piece 148, motion of a recording medium relative to the head assembly 144 should be in a direction represented by arrow 160. During recording, the tail section 156 serves to reduce the perpendicular magnetic field component proximate the second pole piece 148 by redistributing portions of the magnetic field between the first pole piece 146 and the second pole piece 148 to the tail section 156. A normal recording head magnetic field generated by the recorder drive signal, represented by a normal field line 162, has a small perpendicular field component proximate the second pole piece 148 because of a secondary magnetic field represented by secondary field lines 164, which extend between the first pole piece 146 and the free end of the tail section 156. The recorder drive signal may be supplied by the recorder signal source 22 via line 24 as shown in FIG. 3.

Figures 12, 13:
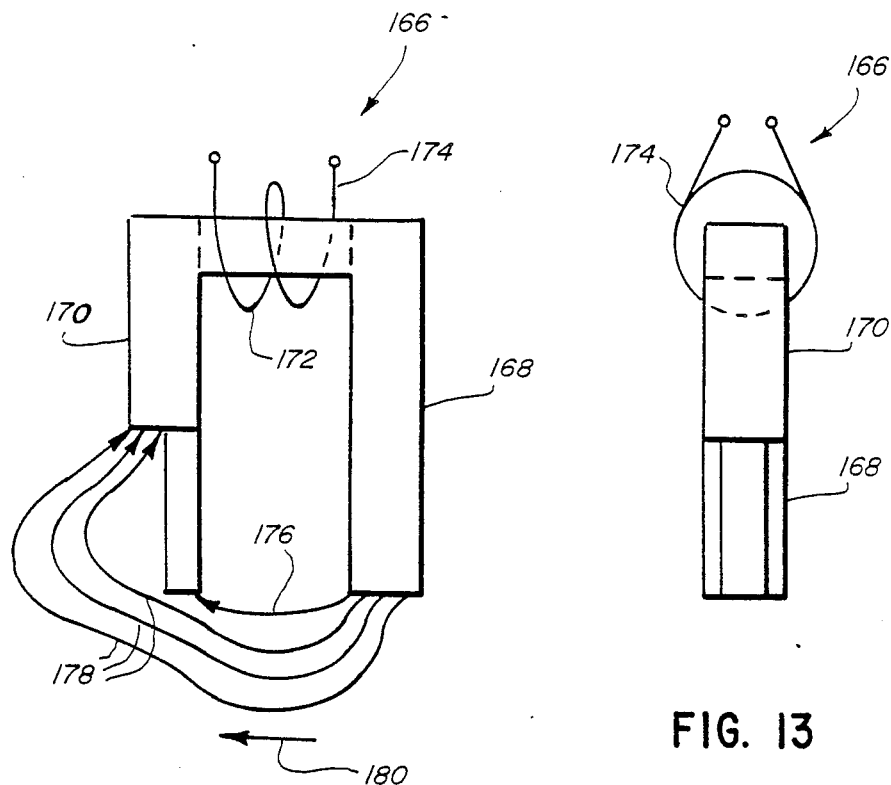
FIGS. 12 and 13 are different views of an eighth embodiment of the present invention.

An eighth embodiment of the invention is shown in top and side views in FIGS. 12 and 13 respectively. A recording head assembly 166 includes a first pole piece 168, a second pole piece 170 including a magnetically saturable region, a bridge 172 between the first pole piece 150 and the second pole piece 170, and a normal coil wound around the bridge 172. During reproduction, the head assembly 166 is the equivalent of any normal recording head, and it provides reasonably good reproduction signal symmetry.

However, the second pole piece has a magnetically saturable region which is represented by the portion of the second pole piece 170 which is reduced in cross sectional area. Because of the reduced cross sectional area, this region will saturate at a lower signal level than the remainder of the second pole piece 170 and the first pole piece 168. The saturation level is selected to be below the recording signal amplitude, and the cross sectional area of the saturable region of the second pole piece 170 is adapted to provide this saturation level. The cross sectional area may be adjusted by changing the width, the thickness, or both the width and the thickness of the saturable region of the second pole piece 170. Both the width and thickness of this region are shown reduced in FIGS. 12 and 13.

When recording, a normal recording field generated by the recorder drive signal is represented by a normal magnetic field line 176 has a small perpendicular field component proximate the second pole piece 170 because of a secondary magnetic field represented by secondary magnetic field lines 178. This secondary magnetic field path is generated because the saturation region forces much of the magnetic flux emanating from the first pole piece 168 to take another path to the second pole piece 170, which reduces the perpendicular field component proximate the second pole piece 170. Of course, since the saturation region is placed on the second pole piece 170 to reduce the perpendicular field component proximate the second pole piece, motion of a recording medium relative to the head assembly should be in a direction represented by arrow 180. The recorder drive signal may be supplied by the recorder signal source 22 via line 24 as shown in FIG. 3.

Thus, there have been herein described various embodiments of the present invention which all suppress perpendicular field components about the downstream pole of longitudinal magnetic recording heads by generating secondary magnetic fields which reduce the perpendicular field components proximate the downstream recording head pole. It will be understood that various changes in the details and materials, and the arrangements and configurations of parts which have been herein described and illustrated in order to explain the nature of the present invention may be made by those skilled in the art within the principle and scope of the invention as expressed in the appended claims.

What is claimed is:

1. For a longitudinal type magnetic recording head used for recording magnetic recording media, said recording head including a first pole piece, a second pole piece and a flux conductive bridge connecting said first pole piece with said second pole piece, a non-magnetic gap between adjacent ends of said first and second pole pieces and a primary magnetic field across said gap between said first and second pole pieces generated by an electric input signal, a method of reducing a perpendicular magnetic field component of said primary magnetic field relative to said gap proximate a selected one of said first and second pole pieces, comprising the steps of:
    generating a secondary magnetic field with said electric input signal, and said first and second pole pieces as a common pole of said secondary magnetic field, to form a localized perpendicular secondary field component opposed to said perpendicular field component proximate said selected one of said first and second pole pieces; and
    proportioning said secondary magnetic field relative to said primary magnetic field to reduce said perpendicular field component of said primary magnetic field proximate said selected one of said first and second pole pieces.

2. The method recited in claim 1, wherein said step of proportioning includes the step of regulating the amplitude of said electric input signal which generates said secondary magnetic field.

3. For a longitudinal type magnetic recording head used for recording magnetic recording media, said recording head including a first pole piece, a second pole piece, a flux conductive bridge connecting said first pole piece with said second pole piece and a non-magnetic gap between adjacent ends of said first and second pole pieces, a method of reducing a perpendicular magnetic field component relative to said gap proximate a selected one of said first and second pole pieces, comprising the steps of:
    generating a first magnetic field with an electric input signal around said first pole piece which includes a first perpendicular field component;
    generating a second magnetic field with said electric input signal, parallel and in phase with said first field, around second pole piece which includes a second perpendicular field component; and
    proportioning the amplitude of said first field relative to said second field to generate a normal field across said gap between said first and second pole pieces having a perpendicular field component which reduces said perpendicular field component of said selected one of said first and second pole pieces.

4. For a longitudinal type magnetic recording head used for recording magnetic recording media, said recording head including a first pole piece, a second pole piece, a flux conductive bridge connecting said first pole piece with said second pole piece, a non-magnetic gap between adjacent ends of said first and second pole pieces and a primary magnetic field across said gap between said first and second pole pieces, a method of reducing a perpendicular magnetic field component of said primary magnetic field relative to said gap proximate a selected one of said first and second pole pieces, comprising the step of:
    coupling a flux conducting member to said selected one of said first and second pole pieces, with a free end of said flux conducting member arranged away from said selected one of said first and second pole pieces to generate a secondary magnetic field which reduces said perpendicular magnetic field component proximate said selected one of said first and second pole pieces.

5. The method recited in claim 4, wherein said step of coupling includes the step of arranging said flux conducting member opposite said selected one of said first and second pole pieces.

6. The method recited in claim 4, wherein said step of coupling includes the step of arranging said flux conducting member at a right angle to said selected one of said first and second pole pieces.

7. The method recited in claim 4, wherein said step of coupling includes the step of arranging said flux conducting member at an acute angle to said selected one of said first and second pole pieces.

8. The method recited in claim 6, further comprising the step of selecting a magnetic domain wall motion flux conducting member as said flux conducting member.

9. The method recited in claim 4, further comprising the step of selecting a linear flux conducting member as said flux conducting member.

10. The method recited in claim 4, further comprising the step of selecting a curvilinear flux conducting member as said flux conducting member.

11. The method recited in claim 4, further comprising the step of selecting a conducting member of bent flux conducting member.

12. The method recited in claim 11, wherein said step of selecting includes selecting a flux conducting member with head and tail sections extending opposed to each other at a substantially right angle to a central section.

13. The method recited in claim 4, further comprising the step of enhancing said secondary magnetic field with an electromagnetic circuit around said flux conducting member.

14. The method recited in claim 4, wherein said step of coupling includes coupling said flux conducting member to said selected one of said first and second pole pieces with a non-magnetic gap.

15. The method recited in claim 4, wherein said step of coupling further comprises the steps of:
    selecting a magnetically saturable bridge having a magnetic flux saturation level less than a magnetic flux recording level; and
    coupling said flux conducting member to a midpoint of said bridge between said first and second pole pieces with said magnetically saturable bridge.

16. For a longitudinal type magnetic recording head used for recording magnetic recording media, said recording head including a first pole piece, a second pole piece, a flux conductive bridge connecting said first pole piece with said second pole piece, a non-magnetic gap between adjacent ends of said first and second pole pieces and a primary magnetic field across said gap between said first and second pole pieces, a method of reducing a perpendicular magnetic field component of said primary magnetic field relative to said gap proximate a selected one of said first and second pole pieces, comprising the step of:

magnetically saturating a region of said selected one of said first and second pole pieces at a magnetic flux saturation level less than a magnetic flux recording level to generate a secondary magnetic field around said saturated region which reduces said perpendicular magnetic field component proximate said selected one of said first and second pole pieces.

17. The method in claim 16, wherein said step of saturating includes the step of restricting the cross-sectional area of a region of selected one of said first and second pole pieces.

18. As part of a longitudinal type magnetic recording head used for recording magnetic recording media, said recording head including a first pole piece, a second pole piece, a flux conductive bridge connecting said first pole piece with said second pole piece, a nonmagnetic gap between adjacent ends of said first and second pole pieces and a primary magnetic field across said gap between said first and second pole pieces generated by an electric input signal, apparatus for reducing a perpendicular magnetic field component of said primary magnetic field relative to said gap proximate a selected one of said first and second pole pieces, comprising:

means for generating a secondary magnetic field with said electric input signal and said first and second pole pieces as a common pole of said secondary magnetic field, to form a localized secondary perpendicular field component opposed to said perpendicular field component proximate said selected one of said first and second pole pieces, and means for proportioning said secondary magnetic field relative to said primary magnetic field to reduce said perpendicular field component proximate said selected pole.

19. The apparatus recited in claim 18, wherein said means for generating includes a coil wound around said first and second pole pieces.

20. The apparatus recited in claim 19, wherein said means for proportioning includes means for regulating the amplitude of said electric input signal.

21. The apparatus recited in claim 19, wherein said means for proportioning includes the number of turns of said coil.

22. As part of a longitudinal type magnetic recording head used for recording transitions on magnetic recording media, said recording head including a first pole piece, a second pole piece, a flux conductive bridge connecting said first pole piece with said second pole piece and a non-magnetic gap between adjacent ends of said first and second pole pieces, apparatus for reducing a perpendicular magnetic field component relative to said gap proximate a selected one of said first and second pole pieces, comprising:

means for generating a first magnetic field with an electric input signal around said first pole piece which includes a first perpendicular field component;

means for generating a second magnetic field with said electric input signal around said second pole piece which includes a second perpendicular field component; and means for proportioning the amplitude of said first field relative to said second field to generate a normal field across said gap between said first and second pole pieces having a perpendicular field component which reduces said perpendicular field component which reduces said perpendicular field component of said selected one of said first and second pole pieces.

23. The apparatus recited in claim 22, wherein said means for generating said first field includes a first coil wound around said first pole piece and said means for generating said second field includes a second coil wound around said second pole piece.

24. The apparatus recited in claim 23, wherein said means for proportioning includes means for regulating said electric signal fed to said first coil relative to said second coil.

25. The apparatus recited in claim 23, wherein said means for proportioning includes the number of turns of said first coil relative to said second coil.

26. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole pieces and a primary magnetic field across said gap between said first and second pole pieces, apparatus for reducing a perpendicular magnetic field component of said primary magnetic field relative to said gap proximate a selected one of said first and second pole pieces, comprising:

a magnetic flux conducting member, arranged for conducting magnetic flux away from said selected one of said first and second pole pieces, to generate a secondary magnetic field which reduces said primary magnetic field perpendicular component proximate said selected one of said first and second pole pieces.

27. The apparatus recited in claim 26, further comprising means for coupling said flux conducting member to said selected one of said first and second pole pieces.

28. The apparatus recited in claim 27, wherein said flux conducting member is coupled opposite said selected one of said first and second pole pieces.

29. The apparatus recited in claim 27, wherein said flux conducting member is coupled at a right angle to said selected one of said first and second pole pieces.

30. The apparatus recited in claim 27, wherein said flux conducting member is coupled at an acute angle to said selected one of said first and second pole pieces.

31. The apparatus of claim 27, wherein said flux conducting member has a linear configuration.

32. The apparatus recited in claim 27, wherein said flux conducting member has a curvilinear configuration.

33. The apparatus recited in claim 27, wherein said flux conducting member includes a plurality of bends.

34. The apparatus recited in claim 27, wherein said flux conducting member includes two opposite right angle bends.

35. The apparatus recited in claim 27, wherein said means for coupling comprises a non-magnetic gap between said flux conducting member and said selected one of said first and second pole pieces.

36. The apparatus recited in claim 35, further comprising means for coupling said flux conducting member to said bridge between said first and second pole pieces.

37. The apparatus recited in claim 36, wherein said means for coupling includes a magnetically saturable bridge coupling said flux conducting member to the midpoint of said bridge between said first and second pole pieces to magnetically balance said recording head for reproduction of said transitions, said saturable bridge including a magnetic saturation region which has a magnetic flux saturation level which is less than a magnetic flux recording level.

38. The apparatus recited in claim 27, wherein said flux conducting member conducts by magnetic domain wall motion.

39. The apparatus recited in claim 38, wherein said flux conducting member is arranged opposite said bridge between said first and second pole pieces.

40. The apparatus recited in claim 27, wherein said primary magnetic field is proportional to a primary electric input signal, and further comprising means for enhancing said secondary magnetic field with said electric input signal.

41. The apparatus recited in claim 40, wherein said means for enhancing comprises a coil wound around said flux conducting member, said coil energized by a secondary electric input signal proportional to said primary electric input signal.

42. The apparatus recited in claim 38, wherein said flux conducting member includes two opposite right angle bends and a mid section arranged parallel to said bridge between said first and second pole pieces, and said coil is arranged around said mid section of said flux conducting member.

43. The apparatus recited in claim 42, wherein said means for coupling includes a non-magnetic gap between said flux conducting member and said selected one of said first and second pole pieces.

44. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole piece and a primary magnetic field across said gap between said first and second pole pieces, apparatus for reducing a perpendicular magnetic field component of said primary magnetic field relative to said gap proximate a selected one of said first and second pole pieces, comprising:
  means for saturating a region of said selected one of said first and second pole pieces to generate a secondary magnetic field around said saturated region which receives said primary magnetic field perpendicular component proximate said selected one of said first and second pole pieces.

45. The apparatus recited in claim 44, wherein said means for saturating comprises a magnetically saturable region of said selected one of said first and second pole pieces.

46. The apparatus recited in claim 44, wherein said magnetically saturable region includes a region of reduced cross sectional area along said selected one of said first and second pole pieces.

47. The apparatus recited in claim 46, wherein said region of reduced cross sectional area includes a region of reduced width along said selected one of said first and second pole pieces.

48. The apparatus recited in claim 46, wherein said region of reduced cross sectional area includes a region of reduced thickness along said selected one of said first and second pole pieces.

49. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole pieces, a primary magnetic field across said gap between said first and second pole piece, said second pole piece positioned downstream from said first pole piece relative to motion of a recording medium surface proximate said first and second pole pieces, apparatus for reducing a perpendicular magnetic field component of said primary magnetic field relative to said gap proximate said second pole piece, comprising:
  a magnetically saturable region along said second pole piece, including a region or reduced cross sectional area which magnetically saturates at a magnetic flux saturation level which is less than a magnetic recording flux level to generate a secondary magnetic field around said saturated region which reduces said primary magnetic field perpendicular component proximate said second pole piece.

50. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole pieces, a primary magnetic field across said gap between said first and second pole piece, and said second pole piece positioned downstream from said first pole piece relative to motion of a recording medium surface proximate said first and second pole pieces, apparatus for reducing a perpendicular magnetic field component of said primary magnetic field relative to said gap proximate said second pole piece, comprising:
  a magnetic flux conducting member coupled to said second pole piece, said flux conducting member having a free end extending away from said second pole piece to generate a secondary magnetic field which reduces said primary magnetic field perpendicular component proximate said second pole piece.

51. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole pieces, a primary magnetic field across said gap between said first and second pole piece, and said second pole piece positioned downstream from said first pole piece relative to motion of a recording medium surface proximate said first and second pole pieces, apparatus for reducing a perpendicular magnetic field component of said primary magnetic field relative to said gap proximate said second pole piece, comprising:

a magnetic flux conducting member, having one end coupled to said second pole piece through a non-magnetic gap, said flux conducting member having a free end extending away from said second pole piece to generate a secondary magnetic field which reduces said primary magnetic field perpendicular component proximate said second pole piece, and said flux conducting member coupled to a midpoint of said flux conductive bridge between said first and second pole pieces by a magnetically saturable bridge to magnetically balance said recording head for reproduction of said transitions, said saturable bridge including a magnetic saturation region which has a magnetic flux saturation level which is less than a magnetic flux recording level.

52. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole pieces, a primary magnetic field across said gap between said first and second pole piece, and said second pole piece positioned downstream from said first pole piece relative to motion of a recording medium surface proximate said first and second pole pieces, apparatus for reducing a perpendicular magnetic field component of said primary magnetic field relative to said gap proximate said second pole piece, comprising:

a magnetic flux conducting member, having one end coupled to said second pole piece, said flux conducting member extending at a right angle to said second pole piece with a free end extending away from said second pole piece, said flux conducting member having a magnetically anisotropic structure for conducting flux from said second pole piece by domain wall motion, to generate a secondary magnetic field which reduces said primary magnetic field perpendicular component proximate said second pole piece.

53. As part of a longitudinal type magnetic recording head used for recording transitions on magnetic recording media, said recording head including a first pole piece, a second pole piece, a flux conductive bridge connecting said first pole piece with said second pole piece, a non-magnetic gap between adjacent ends of said first and second pole pieces, a primary magnetic field across said gap between said first and second pole piece, said primary field proportional to a primary electric input signal, and said second pole piece positioned downstream from said first pole piece relative to motion of a recording medium surface proximate said first and second pole pieces, apparatus for reducing a perpendicular magnetic field component of said primary magnetic field relative to said gap proximate said second pole piece, comprising:

a magnetic flux conducting member, having one end coupled to said second pole piece, said flux conducting member having a free end extending away from said second pole piece to generate a secondary magnetic field which reduces said primary magnetic field perpendicular component proximate said second pole piece; and a coil, energized by a secondary electric input signal proportional to said primary electric input signal, arranged around said flux conducting member, for enhancing said secondary magnetic field to further reduce said primary magnetic field perpendicular component proximate said second pole piece.

* * * * *

UNITED STATES PATENT AND TRADEMARK OFFICE
CERTIFICATE OF CORRECTION

PATENT NO.   : 4,931,886

DATED        : June 5, 1990

INVENTOR(S)  : Michael L. Mallary

It is certified that error appears in the above-identified patent and that said Letters Patent is hereby corrected as shown below:

In column 2, line 60, delete the "a" and insert --as-- in its place.

Col. 10, claim 15, line 61, delete "4" and insert --14-- in its place.

Col. 12, claim 22, line 12, delete "component" through and including "field".

In claim 31, line 59, delete "of" and insert --recited in-- in its place.

Col. 13, claim 44, line 49, delete "piece" and insert --pieces-- in its place.

UNITED STATES PATENT AND TRADEMARK OFFICE
CERTIFICATE OF CORRECTION

PATENT NO. : 4,931,886
DATED : June 5, 1990
INVENTOR(S) : Michael L. Mallary

It is certified that error appears in the above-identified patent and that said Letters Patent is hereby corrected as shown below:

In claim 44, line 58, delete "receives" and insert --reduces-- in its place.

Col. 14, claim 49, line 26, delete "or" and insert --of-- in its place.

Signed and Sealed this

Fifteenth Day of September, 1992

*Attest:*

DOUGLAS B. COMER

*Attesting Officer*  *Acting Commissioner of Patents and Trademarks*